United States Patent [19]

Akashi et al.

[11] 3,767,464

[45] Oct. 23, 1973

[54] MAGNETIC RECORDING MEMBER AND METHOD OF PRODUCING SAME

[75] Inventors: Goro Akashi; Tatsuji Kitamoto; Takeshi Katada; Yasuyuki Yamada; Morita Kazuhiko, all of Odawara, Japan

[73] Assignee: Fuji Photo Film Co., Ltd., Kanagawa, Japan

[22] Filed: Feb. 17, 1972

[21] Appl. No.: 227,251

Related U.S. Application Data

[63] Continuation of Ser. No. 876,412, Nov. 13, 1969, abandoned.

[30] Foreign Application Priority Data

Nov. 13, 1968 Japan .............................. 43/83039

[52] U.S. Cl. ................ 117/237, 117/235, 117/238, 117/240

[51] Int. Cl. .......................................... H01f 10/02

[58] Field of Search .................. 117/235, 237, 240, 117/238

[56] References Cited

UNITED STATES PATENTS

| | | | |
|---|---|---|---|
| 3,216,846 | 11/1965 | Hendricx et al. | 117/62 |
| 3,190,748 | 6/1965 | Landgraf | 75/108 |
| 2,636,892 | 4/1953 | Mayer | 260/439 |
| 3,046,158 | 7/1962 | Fukuda et al. | 117/100 |
| 2,734,034 | 2/1956 | Crowley | 252/62.5 |
| 3,473,960 | 10/1969 | Jacobson et al. | 117/237 |
| 2,688,567 | 9/1954 | Franck | 117/64 |
| 3,186,829 | 6/1965 | Landgraf | 75/.5 |
| 3,476,595 | 7/1966 | Nacci | 117/239 |

*Primary Examiner*—William D. Martin
*Assistant Examiner*—Bernard D. Pianalto
*Attorney*—Sughrue, Rothwell, Mion, Zinn & Macpeak

[57] ABSTRACT

Magnetic recording member having a high Br/Bm ratio, an excellent squareness ratio of the magnetization curve, low noise level and excellent surface smoothness, especially suitable for high density recording, produced by pressing a magnetic recording member having a magnetic recording layer which is composed of an acicular ferromagnetic alloy powder having an average length of larger than 1 micron, dispersed in a binder and being magnetically orientated in order to crush the powder having a larger particle size.

5 Claims, No Drawings

MAGNETIC RECORDING MEMBER AND METHOD OF PRODUCING SAME

CROSS-REFERENCE TO RELATED APPLICATION

The present application is a continuation of U.S. Application Ser. No. 876,412 filed Nov. 13, 1969 and now abandoned.

BACKGROUND OF THE INVENTION

1. Field of the Invention

This invention relates to a method of producing a magnetic recording member, and more particularly to a method of producing an alloy powder-type magnetic recording member having a high saturation magnetic flux density.

2. Description of the Prior Art

At present $\iota$-$Fe_2O_3$ powder is generally used as the ferromagnetic powder of magnetic recording members. Other materials also employed for this purpose are iron and iron-cobalt alloys. Saturation magnetic flux density per unit volume of $\iota$-$Fe_2O_3$ is approximately 5000 gausses. Fe and Fe-Co alloys have saturation magnetic flux densities as high as 21000 to 24000 gausses or about 4 times as high as that of $\iota$-$Fe_2O_3$. Accordingly, about four times as much regenerative output has been expected to be obtained by using a magnetic layer comprising a powder of an iron or iron-cobalt alloy dispersed in an organic binder at the same dispersion ratio (i.e. content of magnetic powder per unit volume of the magnetic layer) and thickness as compared with those of the $\iota$-$Fe_2O_3$ powder. Thus, in order to obtain the same regenerative output as that in $\iota$-$Fe_2O_3$ powder, the thickness of the magnetic layer comprising such an iron or iron-cobalt powder may be reduced to 114 that of a layer containing $\iota$-$Fe_2O_3$ powder.

Since the regenerative output suddenly lowers when the length of a recording unit on the recording member becomes equal to the thickness of the magnet film, the maximum recording density corresponds to a length equal to the thickness of the magnetic coating film. Accordingly, a magnetic recording medium produced by forming a thin magnetic coating film of the alloy powder can be used as a magnetic recording member having a high recording density. Further, in a magnetic recording member for use as a memory tape by which recording is carrried out, the upper limitation of the recording density depends on the mathematical expression $[\alpha/Hc]^{1/2}$ wherein $\alpha$ is the thickness of the magnetic coating film and Hc is coercive force. Therefore, for digital recording use, too, the lower the thickness of the magnetic coating film, the higher the recording density obtained.

Hitherto, it has been attempted to produce alloy powders by many methods for use as the magnetic recording material. On method comprises adding oxalic acid, ammonium oxalate or sodium oxalate to a solution comprising ions of iron, iron-cobalt, iron-cobalt-nickel and additional metal ions to produce oxalates if iron, iron-nickel, iron-cobalt-nickel, and such additional metal, and reacting with a reducing gas such as hydrogen gas at a low temperature such as 350°–500° C., to produce alloy powders. By this method, for example, an alloy powder may be produced by reacting a mixture of iron chloride, cobalt chloride, a nickel salt and another salt in which the ratio of iron chloride to cobalt chloride is nearly 1:1 with oxalic acid to precipitate needle oxalate crystals, and reducing these by hydrogen which possesses 1,600–1,7000 gausses/cc of saturation magnetic flux density, 0.8 ratio of remaining magnetic flux to saturation magnetic flux density and 300–800 oersted or coercive force, and which is excellent as a magnetic recording material.

However, the magnetic powder produced by this method has a particle size of about 10 $\mu$. Consequently, this magnetic powder has the disadvantages of a high noise level and that contact between the magnetic head and the tape surface necessary to record a high density recording is prevented since the surface of the magnetic recording tape is rough and a high recording density cannot be realized. The particles produced by reducing the oxalate have the so-called skeleton structure in which water and oxalic ions which form the initial salt are removed while the external form of the salt crystals are retained upon reduction by hydrogen. In other words, the alloy particles have a skeleton structure in which the primary particles have a particle size less than 0.1 $\mu$ and are loosely packed having a large space ratio. These particles are fragile in the manner of pumice an coke.

For use, these large crude alloy particles are crushed in a ball mill, dispersed in a binder and applied to a substrate to produce a magnetic recording tape. In this method, the acicular shape of the alloy particle is lost and particles become fine and granular. Such particles are difficult to magnetically orient. A magnetic tape produced from such an alloy powder possesses a ratio of remaining magnetic flux to saturation magnetic flux density which is lowered from 0.8 to 0.5–0.6. The squareness ratio of the magnetization curve necessary to the performance of magnetic tape is largerly deteriorated and bias, required recording current and erasing current become large.

On the other hand, it has been known to produce fine particles having suitable particle size by adding a water soluble solvent such as ethanol, acetone or the like during preparation of oxalate of ferromagnetic metal such as iron and cobalt. However, in the production of fine alloy powder by reducing the above-mentioned fine particles, there is a problem in that the effect of the magnetic orientation treatment necessary to improve the angularity of the magnetization curve of the magnetic tape is rapidly lost when the particle size becomes less than 1 $\mu$. Though the reason for this is not clear, it is thought that since the alloy particles have 2–3 times as much saturation magnetic flux density as compared with the iron oxide particles, static magnetic action between the particles becomes 4–9 times of that between the iron oxide particles, which strongly resists the effect of the external static magnetic field used for the magnetic orientation. Accordingly, in order to obtain an alloy tape having a magnetization curve having a good squareness ratio it is necessary to use particles of comparatively large size (i.e., more than 1 $\mu$) wich results in the disadvantages of a high noise level, lack of surface smoothness of the tape and deterioration of the recording density.

SUMMARY OF THE INVENTION

This invention relates to a method for producing a magnetic recording member which comprises dispersing ferromagnetic alloy skeleton particles having more than 1 $\mu$ of average particle length and large anisotropy, which particles have been produced by thermal decomposition and reduction of a compound of ferromagnetic metal ion, in a binder and a solvent, applying the dispersion to a support, carrying out a magnetic orientation treatment to arrange the magnetizing axis of said skeleton particles in a suitable direction, drying and crushing the skeleton particles in the thus formed magnetic layer by pressing said layer.

In the magnetic recording member produced by the method of this invention, noise level and surface smoothness of the magnetic layer are improved by finely crushing the particles and increasing the packing density of th magnetic layer, thus maintaining a good squareness ratio of the magnetization curve in the mangetic recording direction. Thus, a high output of high density recording can be obtained.

As the ferromagnetic alloy powder used in this invention, a material prepared by reducing oxalate is preferred because of its fragility. However, other alloy powders, produced by reducing crystals of iron or cobalt, such as geothite (FeOOH) or the acetate thereof, can be used in this invention.

The skeleton particles of these ferromagnetic alloy powders are dispersed in a binder. This treatment is the most characteristic step in this invention, which is in direct conflict with the previous practice in the art of producing magnetic recording members. This dispersion is carried out gently so that particles having a particle size of more than 1 $\mu$ remain in an amount of more than 20 percent by volume based on the whole amount of skeleton particles present. This is ascertained by the following Example 2. Application of the resulting dispersion to a support, magnetic orientation and drying can be carried out by the methods of the prior art. The crushing of the large alloy particles after production of the magnetic tape, which is the most characteristic step, is preferably carried out by means of a press roll from the viewpoint of continuous treatment and uniform pressing. However, it is possible to adopt other methods, such as beating the surface of the tape by a vibrating article.

As the support used in this invention, any form, such as sheets, tapes, disks, and the like may be used and any non-magnetic material, such as synthetic resin, metal, wood and the like may be used. In the following example, for instance, although a tape is used, any support may be used. It is the magnetic layer which is important to the present invention.

The invention will be explained in more detail by the following examples and a comparative example.

COMPARATIVE EXAMPLE

An aqueous solution of oxalic acid was added to an aqueous solution of ferrous chloride and cobalt chloride in the molar ratio of 65:35 to produce fine needle crystals of (ferrous-cobalt) oxalate having 10 $\mu$ of crystal length and 1 $\mu$ of crystal width. After separating by filtration, washing with water and drying, the crystals were allowed to stand in a hydrogen stream at 400° C. for about 5 hours to produce a metal iron-cobalt alloy powder. 300 g of this powder were treated, together with binder components consisting of 60 g of cellulose acetate butglate, 30 g of dibutylphthalate, 4 g of a nonionic surface active agent, 1 g of silicone oil and 3 g of fluorinated oil and 600 g of butyl acetate as the solvent in a ball mill utilizing steel balls having a diameter of 10 mm for 2 days until the magnetic powder (the abovementioned alloy powder) in the dispersion no longer possessed its original form. Then the dispersion was applied to a polyester film to form a layer having about 8 $\mu$ of thickness after drying. Magnetic orientation treatment was carried out immediately after application by passing the layer through a coil in which a static magnetic field of 1000 oersteds was generated, whereby a uniaxial easy magnetizable direction was formed in the layer. Magnetization characteristics of the magnetic coating layer resulting by drying were a Br/Bm ratio of 0.60 and 420 oersteds of coercive force. From these values, it can be recognized that the squareness ratio of the magnetization curve was deteriorated.

Two comparative examples were prepared by separating this sample into two samples, one of which was cut into tapes without carrying out any treatment (Sample A) and the other was pressed strongly by a press roll at a pressure of 150kg/cm to crush the alloy magnetic powder in the dried magnetic layer into primary particles (by this treatment, the thickness of the coating layer of the sample became 5 $\mu$ and the surface became flat and mirrorlike) and cut into tapes (Sample B).

The Br/Bm ratio and the coercive force of Sample B was hardly different from the values described above. These facts show the pressing treatment has no influence upon the characteristics of Br/Bm and coercive force.

The characteristics of Sample A and Sample B produced by this invention are examined together with a sample from the following Example 1.

EXAMPLE 1

An alloy magnetic powder as produced in the Comparative Example was mixed together with the same components as in the Comparative Example but the ball mill treatment was carried out using glass beads having a diameter of 2 mm by stirring slightly for about 5 hours in order not to destroy the shape of the alloy magnetic powder during treatment. The majority of the alloy magnetic powder after treatment still possessed its original shape. The resulting dispersion was applied to the polyester film by the same procedure as in the Comparative Example (thickness of the dry coating layer was 10 $\mu$), magnetic orientation was carried out and the coated film dried to obtain a magnetic recording sample. Magnetization characteristics of the resulting sample were a Br/Bm of 0.80 and 400 oersteds of coercive force. From these values, it can be recognized that the squareness ratio of the magnetization curve was excellently preserved.

This sample was treated by the same procedure as the Comparative Example to obtain a sample upon which was carried out a pressing treatment (this is Sample 1 of this invention in which the thickness of the coating film layer became 5 $\mu$) and a sample upon which a pressing treatment was not carried out (Comparative Sample C). The Br/Bm ratio and the coercive force of Sample 1 were equal to those of Comparative Sample C.

Sensitivity, output at 7 KHz and S/N ratio of tapes of 1/4 inch (about 6.35 mm) width produced from Sample I and Comparative Samples A, B and C were determined by means of a tape recorder at 19.5 cm/sec. of tape running speed. Further, variation of output of tapes having a width of 1/2 inch (about 12.70 mm) over a rising range of recording densities and used as memory tape for external memory recording of a computor was determined. Results of the former are shown in Table 1 and the results of the latter are in the drawing.

TABLE 1

| Sample | Thickness of magnetic layer | Sensitivity | Output at 7 KHz | S/N ratio |
|---|---|---|---|---|
| A | 10 μ | +0dB | −8dB | −52dB |
| B | 5 μ | +0.5dB | −4dB | −52dB |
| C | 8 μ | +2dB | −4dB | −42dB |
| 1 | 5 μ | +3dB | +7dB | −52dB |

As is clear from the results shown in Table 1, the output at 7 KHz in Sample 1 of this invention was high as compared with Comparative Sample A, B and C, and especially the S/N ratio was notably improved as compared with Sample C which was not subjected to the pressing treatment. The Figure is a graph which shows the relationship between regenerative output and recording density measured on magnetic recording tapes produced by the various examples. In the Figure, the axis of abscissa represents the recording density (unit: bit/2.54 mm by NRZ process) and the axis of ordinate represents normalized regeneration output (percent). Marks corresponding to each sample are applied on each curve which shows the determination value. As is clear from this graph, decay at a high recording density of Sample 1 was low as compared with the other samples. Further, when Sample 1 was used as video tape for broadcasting and domestic video tape, output thereof was 3dB and 6dB higher, respectively, than that of the tapes comprising a $\iota$-$Fe_2O_3$ powder, which showed the characteristic of high output at high density recording.

EXAMPLE 2

In order to observe variations of the magnetic field orientation effect according to the degree of crushing in Example 1 and the Comparative Example, an alloy powder was crushed to different degrees by using two kinds of ball mill balls, that is, glass beads, which have comparatively low specific gravity and steel balls which have a comparatively high specific gravity, and varying the diameter of the balls and period of powdering in the ball mill. Results were compared after applying the resulting coating solutions and carrying out the magnetic orientation treatment. The degree of crushing was calculated as the volume ratio of particles having a particle size of less than 1 μ (the majority thereof were fine particles powdered to a particle size of 0.1-0.2 μ to the whole particles by measuring the volume of particles having a particle size more than 1 μ and the volume of particles having a particle size of less than 1 μ by means of an electron microscope. The effect of magnetic field orientation was represented by Br/Bm, which represents the squareness ratio of the magnetization curve of the resulting tapes.

TABLE 2

| Sample | Method of Dispersion | Degree of Crushing | Br/Bm |
|---|---|---|---|
| 2 | treating for 5 hours using glass beads having 2 m/m diameter | 10% | 0.80 |
| 3 | treating for 24 hours using glass beads having 2 m/m diameter | 25% | 0.75 |
| 4 | treating for 48 hours using glass beads having 2 m/m diameter | 40% | 0.75 |
| 5 | treating for 24 hours using steel balls having 2 m/m diameter | 75% | 0.68 |
| 6 | treating for 24 hours using steel balls having 1 m/m diameter | 90% | 0.57 |
| 7 | treating for 48 hours using steel balls having 1 m/m diameter | 95% | 0.55 |

The BR/Bm of Sample 1, which has the most preferable Br/Bm ratio, but is not subjected to magnetic field orientation, is 0.60. The Br/Bm of the magnetic tape using $\iota$-$Fe_2O_3$ is 0.70–0.75. Accordingly, in order to sufficiently utilize a high Bm value of the alloy powder, it is preferable that Br/Bm is at least 0.65. If it is not, then not only is the effect of the high output of the alloy magnetic tape diminished, but the recording current necessary to obtain the maximum output becomes remarkably large because of deterioration of the squareness ratio of the magnetization curve together with a rather high coercive force of the alloy tape. Accordingly, it will be understood from the results of this example that to retain particles having 1 μ of particle length, which are not crushed completely and easily orientated by the action of a static magnetic field in the amount of over 20 percent is necessary in order to maintain a high Br/Bm ratio and good ratio of squareness of the magnetization curve. Further, when the pressing treatment was carried out on the sample of this example after drying, almost no variation of magnetic characteristics such as coercive force and Br/Bm were observed.

What is claimed is:

1. A method of producing a magnetic recording member which comprises preparing ferromagnetic alloy skeleton particles having an average particle size larger than 1 μ in length and a large anisotropy by the thermal decomposition and reduction of ferromagnetic metal compounds, dispersin said particles in a binder in the presence of a solvent, applying the resultant dispersion to a support, magnetically orienting said particles in a suitable direction, drying and thereafter crushing said skeleton particles in the thus formed magnetic layer to produce a majority of particles having a particle size of from 0.1 to 0.2 micron by pressing said layer, wherein said dispersing is conducted under conditions such that at least 20 percent by volume, based on the total volume of said alloy skeleton particles in the resulting dispersion, of said alloy skeleton particles has an average particle length of greater than 1 μ.

2. The method of claim 1 wherein said ferromagnetic metal compound is a ferromagnetic metal oxalate.

3. The method of claim 1 wherein said ferromagnetic-metal compound is selected from the group consisting of ferrous-cobalt oxalate, ferrous-cobalt acetate and geothite.

4. A magnetic recording member produced by the process of claim 1.

* * * * *